Oct. 11, 1966 J. KARLOVSKY, JR., ETAL 3,278,237
MINING MACHINE WITH SLIDABLE CUTTER BAR EXTENSIONS
Filed July 3, 1964 2 Sheets-Sheet 1
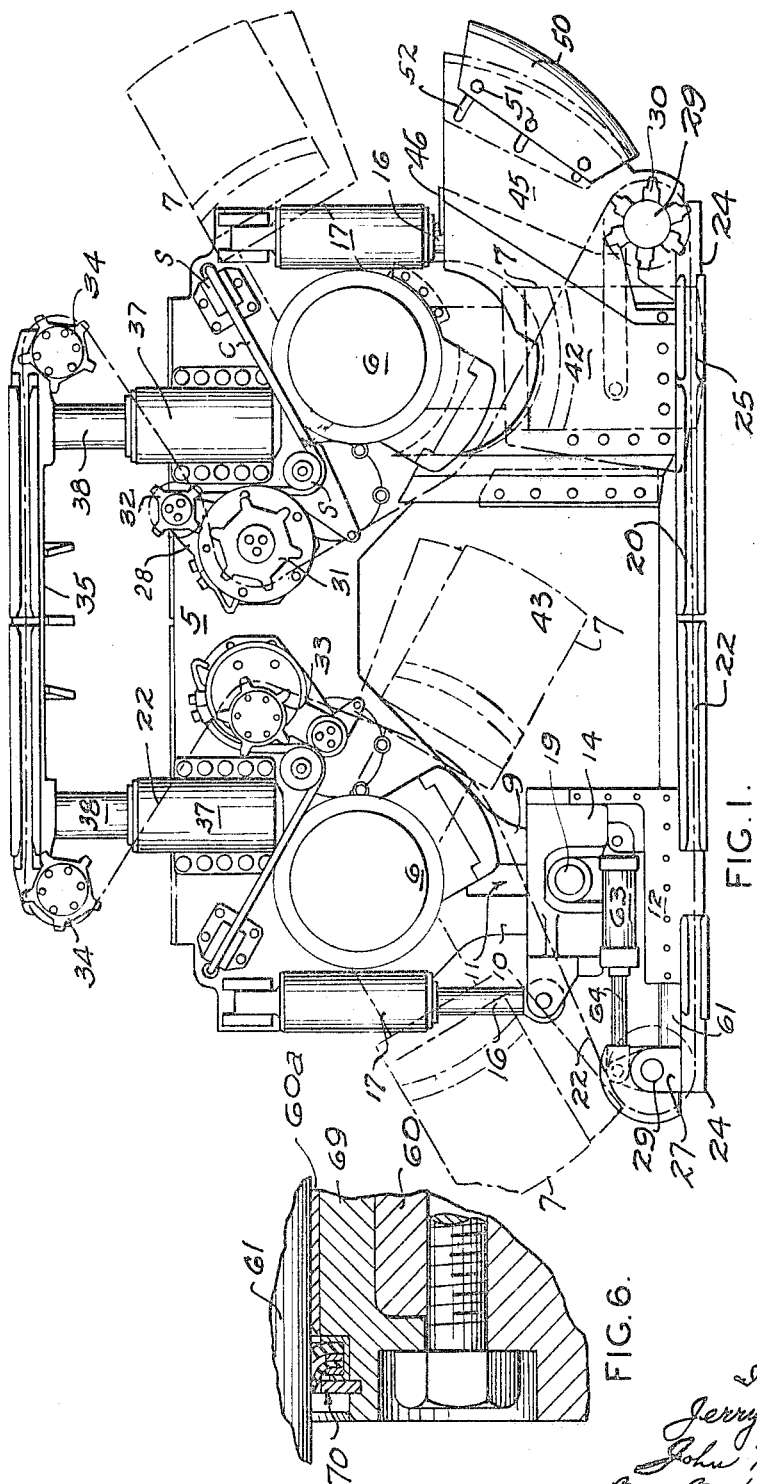
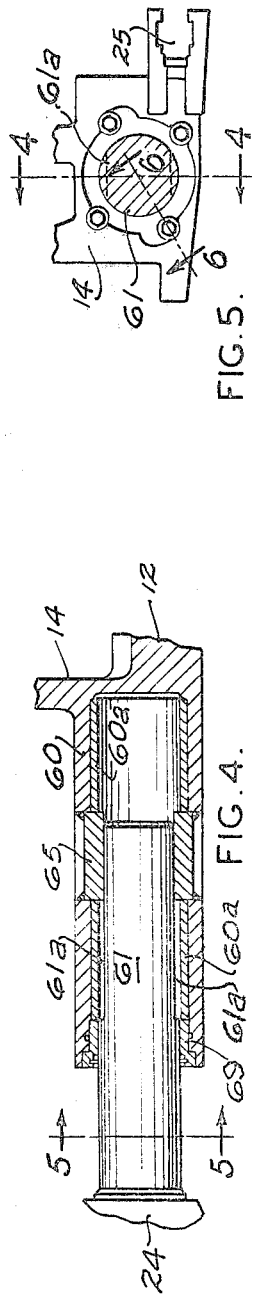
Inventors
Jerry Karlovsky, Jr.
John M. Cookson
By Bedell and Burgess
attys.

United States Patent Office 3,278,237
Patented Oct. 11, 1966

3,278,237
MINING MACHINE WITH SLIDABLE CUTTER
BAR EXTENSIONS
Jerry Karlovsky, Jr., and John M. Cookson, both of Nashville, Ill., assignors to National Mine Service Company, Pittsburgh, Pa., a corporation of West Virginia
Filed July 3, 1964, Ser. No. 380,157
10 Claims. (Cl. 299—59)

The invention relates to a continuous mining machine of the type including a main frame and a traveling carriage support therefor, and boring shafts extending lengthwise of the machine and carrying radially adjustable rotor arms on their forward ends mounting cutters which bore into the face of a mine seam as the machine is advanced. Rearwardly of the rotating cutter arms are upper and lower cutter bars. An endless cutter chain is mounted in grooves in the cutter bars and on a series of sprockets, including sprockets journaled on the cutter bars. The chain traveling longitudinally in opposite directions at the top and bottom of the machine and upwardly and downwardly at opposite sides of the machine removes cusps between the bores made by the rotary cutter arms. The cutter or trimmer bars are adjustable vertically to accommodate the diameter of the bores. It is desirable to project and retract the sprockets on the ends of the lower cutter bar horizontally to widen or narrow the floor of the cut and to facilitate withdrawal of the machine from the bore respectively. Such projection and retraction of the lower cutter bar sprockets is usually effected by mounting the lower cutter bar sprockets on arms pivoted on the cutter bar to swing downwardly and outwardly to project or extend the lower cutter sprockets and upwardly to retract or withdraw the sprockets. One such arrangement is described in United States Patent No. 2,991,059.

Among the objects of the present invention are to simplify the construction and facilitate the operation of cutter bar sprocket extension and retraction structure; to mount the sprockets so that their projections and retractions are on a horizontal line at the level of the lower cutter bar; to position moving parts of their actuating mechanism at the level of the lower part of the cutter bar thus making the cutter bar support mechanism more accessible than where the lower sprockets are mounted on pivotal arms; and to project and retract pusher plates with the cutter bar extensions.

In the accompanying drawings:

FIG. 1 is a front view of a continuous mining machine with parts broken away to better illustrate the construction.

FIG. 4 is a detail longitudinal section on line 4—4 of FIG. 5 and showing an extension rod and its mounting.

FIG. 5 is a detail transverse section on line 5—5 of FIG. 4.

FIG. 6 is a detail section on line 6—6 of FIG. 5 and drawn on a larger scale and showing a seal between the extension rod and its mounting.

Figure 2:
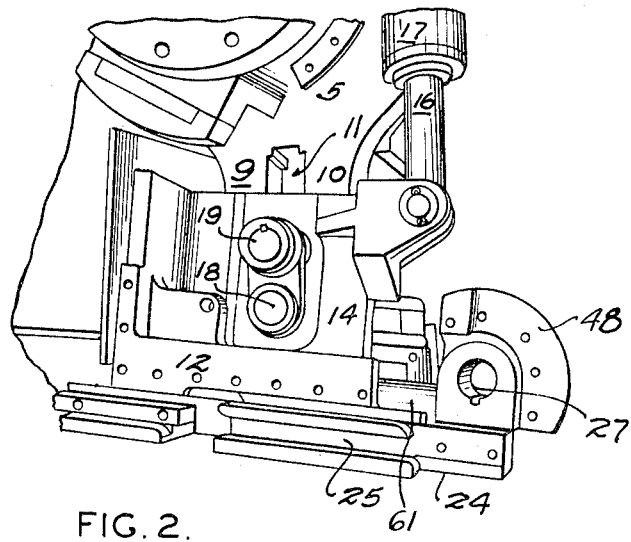
FIG. 2 is a front perspective of the lower right hand portion of FIG. 1 with the cutter bar extension projected and with some of the structure removed to better illustrate the parts mounting the sprocket, the cutter chain and the pusher plates.
Figure 3:
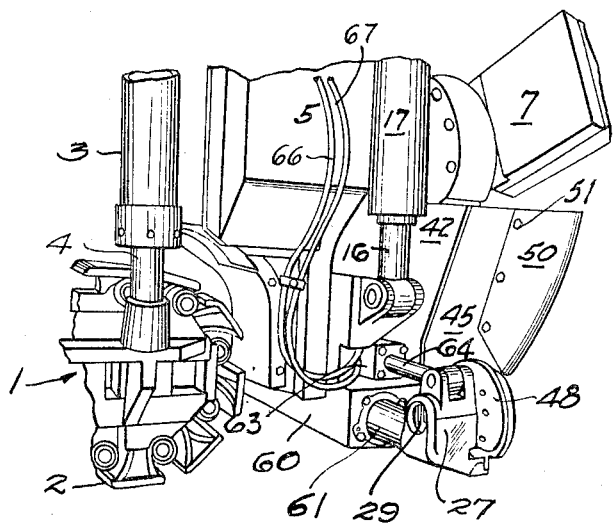
FIG. 3 is a perspective of the end of the cutter arm at one side of the machine, showing the extension and the pusher plates projected and looking at the rear thereof or in the opposite direction of FIG. 2.

The mining machine illustrated includes a main frame 1 mounted on a traveling carriage, such as an endless track 2, and mounting a plurality of upright cylinders 3 and pistons 4 supporting a gear case 5. Journaled in the gear case and projecting forwardly therefrom are a pair of rotary boring shafts 6 mounting radial cutting arms 7 at their forward end. Each end of the gear case includes depending legs 9, 10 forming an upright slot 11 between them. A lower cutter bar or trimmer bar 12 extends transversely of the machine behind cutting arms 7 and includes upright sections 14 bearing against the forward faces of legs 9, 10 and the bar is supported by upright pistons 16 in cylinders 17 mounted on the gear case. The cutter bar is guided in its vertical movement by pins 18, 19 slidable in slots 11.

The cutter bar has a lower, forwardly-opening groove 20 which receives and guides the cutter chain 22. This groove terminates inwardly of the end of the cutter bar body and a cutter bar extension 24 is slidable on each end portion of the cutter bar body and projects outwardly from the latter and has a groove 25 forming a continuation of groove 20. The outer end of each extension includes a bearing 27 receiving a journal 29 for a sprocket 30 over which cutter chain 22 passes as its direction changes from substantially horizontal to diagonal. The cutter chain passes over driving sprocket 31, a take-up sprocket journaled on the swinging end of an arm 28 pivoted on the gear case. A cable C is secured to arm 28 and passes over sheaves S and may be actuated by a cylinder and piston (not shown) on the side of the machine to pull sprocket 32 downwardly to tighten chain 22 in a manner well known in the art and forming no part of the present invention, and an idler sprocket 33, all mounted on gear case 5, and then over sprocket 34 journaled on the ends of an upper cutter bar or trimmer bar 35 mounted on the gear case by upright cylinders 37 and their pistons 38.

Fixed to each end portion of the body of lower cutter bar 12 is a pusher plate 42 extending from the side of the conveyor throat 43 to a position forwardly of cylinder 17. A supplemental pusher plate 45 has a lip 46 which is slidably supported on the upper edge of pusher plate 42. Plate 45 is secured to a flange 48 on bearing 27 and moves with the extension as it is projected and retracted.

An additional floating pusher plate 50 overlaps each supplemental pusher plate 45 and has studs or pins 51 which are received in outwardly and downwardly inclined slots 52 in supplemental pusher plate 45 so that the floating plate 50 is free to move between the solid and broken line positions shown in FIG. 1 to adjust for the width of the bore made by the rotary cutters and cutter chain.

Each end of lower cutter bar 12 includes an integral cylinder 60 disposed lengthwise of the cutter bar and opening toward the side of the machine, and provided with a sleeve 60a. An extension support rod 61 is slidable in sleeve 60a, and its outer end is received in and supports extension 24, bearing 27, sprocket journal 29 and sprocket 30 thereon. A fluid pressure cylinder 63 and its piston rod 64 are connected at opposite ends to the cutter bar and to the bearing end of extension 24. Fluid pressure supply lines 66, 67 lead to opposite ends of cylinder 63 from manual control valves (not shown) whereby the extension may be projected and retracted as required. Extension rod 61 has flattened portions 61a engaged by keys 65 inserted in the wall of cylinder 60 whereby the extension rod and the parts supported by it are held against rotation about the rod axis. A collar 69 is bolted to the outer end of cylinder 60 and seats against the end of sleeve 60a and is provided with a seal 70 for the rod which excludes dirt and water from the opposing sliding faces of the extension and its mounting, including flats 61a and keys 65.

With this construction the width of the lower portion of a seam entry is readily varied; the lower reach of the cutter chain is adjustable along a horizontal line and the cutter chain is at the same level throughout its reach; the pusher plates are similarly adjustable by sliding movement transversely of the machine; and the lower sprockets are directly backed up by the cutter bar body, through their support rods, irrespective of the position of the sprockets.

The details of the structure may be varied substantially without departing from the spirit of the invention and the exclusive use of those modifications coming within the scope of the claims is contemplated.

What is claimed is:

1. In a continuous mining machine having a gear case, rotary boring bars journaled in said gear case and extending forwardly therefrom and provided with radial cutter arms, upper and lower cutter bars mounted on said gear case and extending transversely of the machine behind said radial cutter arms, said lower cutter bar including a forwardly opening groove, a horizontally elongated support mounted in said lower cutter bar to slide horizontally of the machine and at the rear of said groove, a sprocket journaled on the outer end of said support, a cutter chain received and guided in said groove and passing over the sprocket, and a device mounted on the machine behind said groove and said chain and operatively connected to said support to project and retract it in its mounting.

2. In a continuous mining machine including a gear case and parallel rotary boring shafts disposed lengthwise of the machine and journaled in said gear case and having radial cutter arms, a lower cutter bar extending horizontally transversely of the machine behind said arms and including upstanding portions slidable vertically on said gear case, horizontally elongated supports slidable in said portions transversely of the machine and at each side of the machine, cutter bar extensions mounted on the outer end portions of said supports, sprockets journaled on said extensions, an endless cutter chain guided by said bars and extensions and sprockets, and power means for projecting and retracting the supports and extensions relative to the cutter bar to adjust the length of the lower reach of said cutter chain.

3. In combination with a structure according to claim 2, a pusher plate member adjacent to each sprocket and movable with the sprocket and the associated extension and relative to the cutter bar.

4. In combination with a structure according to claim 2, a pusher plate adjacent to each sprocket and fixed on the cutter bar behind the cutter chain, and a supplemental pusher plate member extending outwardly beyond each sprocket and slidably mounted on said fixed pusher plate and outwardly therefrom and movable with the adjacent sprocket transversely of the machine.

5. In combination with a structure according to claim 2, a pusher plate adjacent to each sprocket and fixed on the cutter bar behind the cutter chain, a supplemental pusher plate member slidably mounted on said fixed pusher plate and extending outwardly beyond the sprocket and movable with said sprocket transversely of the machine, and a floating pusher plate slidably mounted on said supplemental pusher plate and movable by gravity outwardly and downwardly of the supplemental pusher plate.

6. In combination with a structure according to claim 2, a pusher plate adjacent to each sprocket and fixed on the cutter bar behind the cutter chain, a supplemental pusher plate member slidably mounted on said fixed pusher plate and extending outwardly beyond the sprocket and movable with said sprocket transversely of the machine, said supplemental pusher plate having outwardly and downwardly inclined slots, a floating pusher plate overlapping said supplemental pusher plate and having fixed studs projecting through said slots for supporting the floating pusher plate, said studs being slidable down said inclined slots by gravity to project said floating pusher plate beyond the outer edge of said supplemental pusher plate.

7. In a continuous mining machine, a lower cutter bar provided with a cylinder with its axis elongated lengthwise of the cutter bar and opening outwardly of the end of the cutter bar, a support member slidable in said cylinder and projectible therefrom, a cutter chain sprocket journaled on said support member, an operating cylinder and piston rod substantially parallel to said cutter bar cylinder and connected to said cutter bar and support member respectively, and fluid pressure means connected to said operating cylinder and piston for advancing and retracting the latter and said support member.

8. A continuous mining machine cutter bar structure provided with an elongated body member provided with a lengthwise groove for guiding reception of a cutter chain, said structure including an integral cylinder elongated lengthwise of said structure and mounted thereon, a piston in said cylinder having a rod extending therefrom beyond the end of said body, an extension slidable along said structure and having a groove aligned with said body member groove, the end of said piston rod being connected to the outer portion of said extension, and a chain sprocket journaled in said extension with its periphery substantially tangent to said extension groove.

9. In combination in a continuous miner, a gear case having depending slotted legs forming upright guides, parallel rotary boring bars journaled in the gear case, a horizontally disposed lower cutter bar extending between and beyond said guides and having upstanding arms slidable on said guides, upright cylinders mounted on the end portions of said gear case and having depending pistons connected to said cutter bar, an extension slidable horizontally on each end portion of said cutter bar, horizontally disposed cylinders mounted on the adjacent cutter bar arms, and pistons in said latter-mentioned cylinders extending outwardly beyond said arms and connected to said extensions, and manually selective means for supplying fluid pressure to said cylinders at opposite sides of said pistons.

10. In combination in a continuous mining machine, a lower cutter bar having an elongated bottom member, each end portion of which forms an integral cylinder elongated lengthwise of the member and opening outwardly of the end of the member, there being a cutter bar extension slidable over each end portion of the member parallel to said cylinder and provided with a sprocket journal at its outer end with an axis extending transversely of the length of the member, and an elongated rod freely slidable in said cylinder and projecting therefrom and supporting said cutter bar extension and sprocket vertically and against thrust longitudinally of the machine.

References Cited by the Examiner
UNITED STATES PATENTS

| | | | |
|---|---|---|---|
| 2,801,836 | 8/1957 | Risse | 299—59 |
| 2,885,196 | 5/1959 | Karlovsky | 299—59 |
| 3,041,054 | 6/1962 | Ball | 299—59 |

ERNEST R. PURSER, *Primary Examiner.*